United States Patent [19]
Bridges et al.

[11] Patent Number: 5,379,317
[45] Date of Patent: Jan. 3, 1995

[54] MICROWAVE-EXCITED SLAB WAVEGUIDE LASER WITH ALL METAL SEALED CAVITY

[75] Inventors: William B. Bridges; Yongfang Zhang, both of Pasadena, Calif.

[73] Assignee: California Institute of Technology, Pasadena, Calif.

[21] Appl. No.: 68,853

[22] Filed: May 28, 1993

[51] Int. Cl.⁶ ............................................. H01S 3/032
[52] U.S. Cl. ............................................. 372/64; 372/82
[58] Field of Search ................. 372/55, 61, 64, 69, 372/81–84

[56] References Cited

U.S. PATENT DOCUMENTS

| | | | |
|---|---|---|---|
| 4,780,881 | 10/1988 | Zhang et al. | 372/81 |
| 4,955,035 | 9/1990 | Gekat | 372/69 |
| 5,043,995 | 8/1991 | Lackner | 372/82 |
| 5,224,117 | 6/1993 | Krüger et al. | 372/82 |
| 5,255,282 | 10/1993 | Remo | 372/82 |

Primary Examiner—John D. Lee
Attorney, Agent, or Firm—Michael L. Keller; Robert M. Wallace

[57] ABSTRACT

An all metal, microwave-pumped, waveguide $CO_2$ laser includes a waveguide providing a vacuum envelope containing the $CO_2$ gas having a longitudinal ridge extending at least partially across the width of the waveguide and extending along a length of the waveguide and a ceiling facing the ridge. The ridge and ceiling have horizontal surfaces facing one another which together function as an optical waveguide of the laser and define a longitudinal optically active region therebetween which, in the preferred embodiment, opens out into remaining portions of the waveguide along either side of said ridge. A pair of reflecting mirrors are located at each end of said optically active region and an antenna or ramped waveguide couples a microwave source into the waveguide.

17 Claims, 4 Drawing Sheets

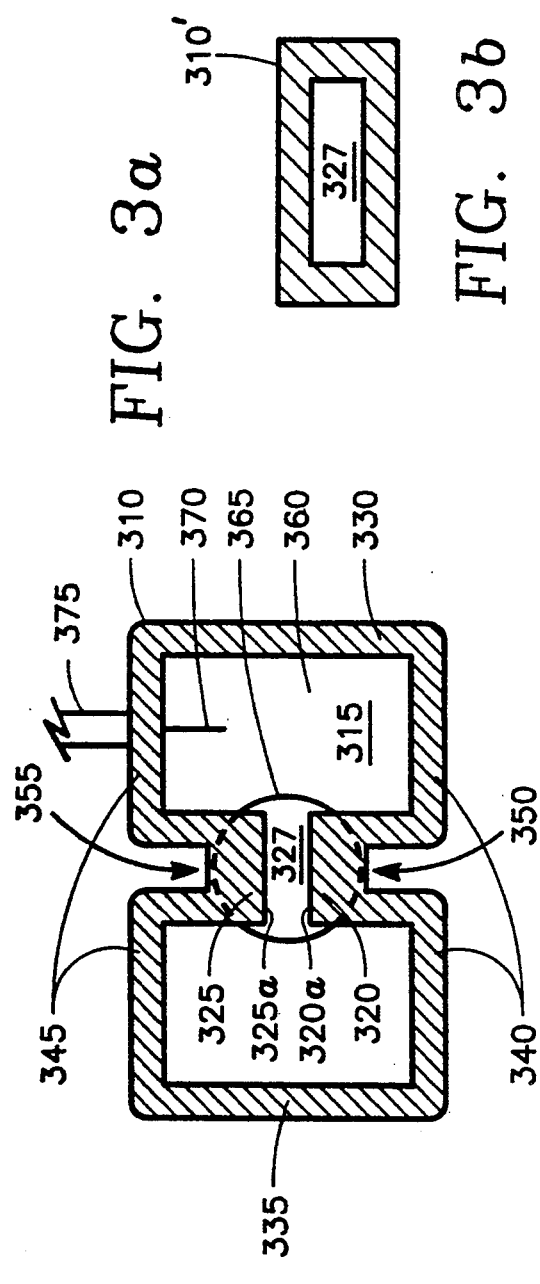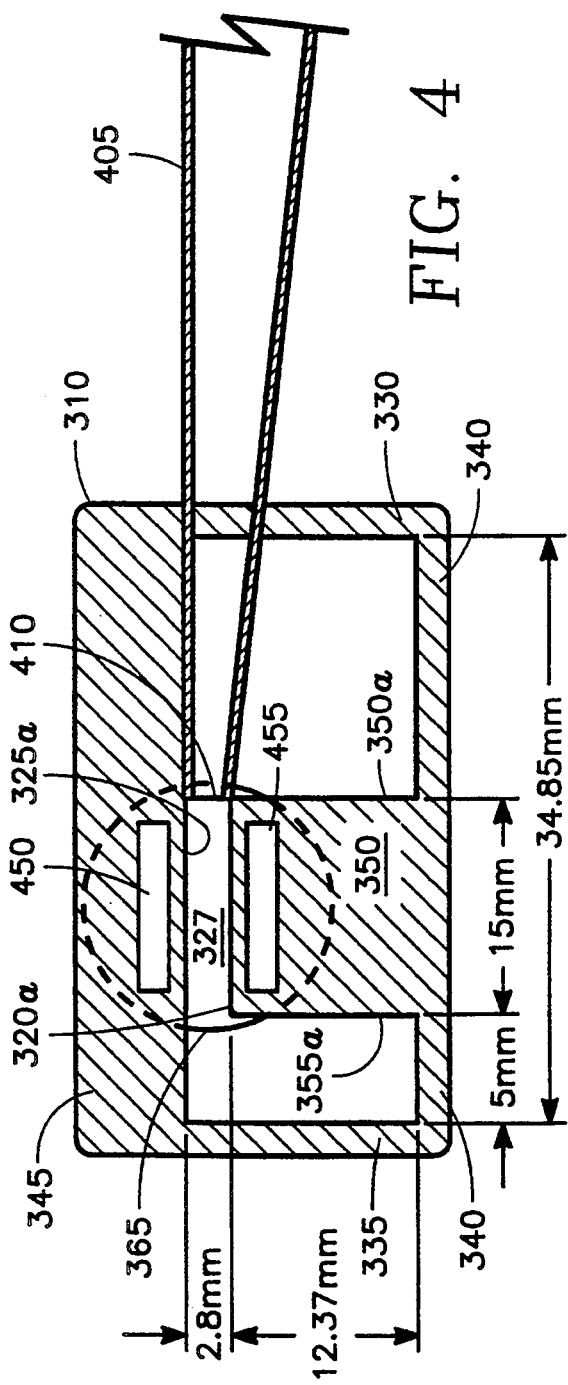

MICROWAVE-EXCITED SLAB WAVEGUIDE LASER WITH ALL METAL SEALED CAVITY

BACKGROUND OF THE INVENTION

1. Origin of the Invention

This invention was developed in the course of performance under Air Force Contract No. AFOSR-88-0085.

2. Technical Field

The invention is related to $CO_2$ waveguide lasers, and in particular to microwave excitation of such lasers.

BACKGROUND ART

The first $CO_2$ lasers were open Fabry-Perot optical resonators pumped by high frequency RF energy or direct current inside a glass vacuum envelope. The resonator was designed so that the optical modes were contained within and did not intersect the glass vacuum envelope. A disadvantage of the open Fabry-Perot resonator is that there is a fixed relationship between the resonator diameter, length and mirror curvature which severely limits laser performance. This disadvantage was overcome in an optical waveguide version of the $CO_2$ laser in which the insulating vacuum envelope, typically made of aluminum oxide or beryllium oxide ceramic, acted as an optical waveguide along the path between two reflecting mirrors, this laser being pumped by a 10 kV discharge. A disadvantage of this optical waveguide $CO_2$ laser is that it required an inordinantly high D.C. excitation voltage for a given laser length, which in turn limited the length and therefore the output power. This latter disadvantage was overcome in the transverse waveguide RF-excited $CO_2$ laser by K. Laakmann, illustrated in FIG. 1 herein. In the transverse waveguide-RF excited $CO_2$ laser, the plasma is contained inside a ceramic longitudinal cavity 110. A pair of RF electrodes 120, 130 extending on opposite sides along the entire length of the cavity 110 receive RF energy from a tunable RF source 140. The length of this laser may be increased to increase output power without a proportionate increase in required RF excitation voltage, a great advantage. However, a fundamental limit on laser output power is reached in the range of 20 to 40 watts, at which the mirror coating is burned after brief use.

Therefore, there is a need to reduce the flux of optical power at the mirrors without reducing output power, which requires distributing the beam across the mirrors. One means of reducing this flux density was given by DeMaria and Bridges (U.S. Pat. No. 4,813,052) and Bridges (U.S. Pat. No. 4,884,282), who used a multiplicity of waveguides in parallel, with interwaveguide coupling to lock all the oscillations in phase. This method works, but results in a complicated and expensive ceramic structure. It is therefore one object of the invention to distribute or spread the laser beam at the mirrors across a large area without reducing the beam intensity or power, and do so in a simple, inexpensive fashion.

The inventors herein have conceived of accomplishing the foregoing object by a hybrid structure illustrated in FIG. 2, exhibiting the behaviors of both (a) the open Fabry-Perot resonator and (b) the optical wave guide laser in different orthogonal directions. The hybrid structure of FIG. 2 consists of a pair of longitudinal optical waveguides/electrodes 210, 220 extending along the entire length of the laser cavity and separated by a pair of ceramic insulators 230, 240, the top electrode 210 being connected to an RF conductor 250 and the bottom electrode 220 being grounded to a metal vacuum envelope 260. The mirror curvature, cavity cross-section and cavity length are selected so that the optical modes are contained within and do not intersect the insulators 230, 240 (as in the open Fabry-Perot resonator), but are confined by the optical waveguide/electrode pair 210, 220 (as in the optical waveguide laser). Thus, the laser of FIG. 2 exhibits the characteristics of an open Fabry-Perot resonator in the X direction and exhibits the characteristics of an optical waveguide laser in the Y direction. The advantage of such a hybrid laser would be that the optical waveguide pair 210, 220 confines the beam to a narrow aspect ratio, thus providing a way of increasing the distribution of the beam power across the mirrors in one dimension to alleviate mirror damage while preserving a desirably small characteristic dimension for the plasma in the other dimension. The disadvantage is that the interface between the ceramic insulators 230, 240 and the metal waveguides 210, 220 cannot be easily vacuum sealed, and therefore the external vacuum envelope 260 is required, increasing the size and complexity of the laser.

Accordingly, an additional object of the invention is to eliminate the need for a separate vacuum envelope structure 260.

A related object of the invention is to provide a simple integral structure serving as both optical waveguide and vacuum envelope and permitting the laser to be excited by a very inexpensive microwave source.

SUMMARY OF THE INVENTION

The invention is a microwave-excited all-metal planar waveguide laser consisting of a waveguide of bare metal slab walls which function simultaneously as a microwave waveguide, an optical waveguide and a vacuum envelope. The structure has a relatively narrow intermediate portion between two opposing horizontal closely-spaced metal slab sections, the two closely-spaced slab sections serving as an optical waveguide of the laser, and the whole structure serving as a microwave waveguide. The intermediate section or narrow region between the two closely-spaced slab sections is the optically active region of the laser. In the preferred embodiment, the intermediate section opens out along both sides to larger sections so that there are no vertical walls near the optically active region between the two closely-spaced slab sections. This structure then serves as a metal ridge waveguide for the microwave power that excites the plasma. This structure permits the microwave electromagnetic field to be virtually uniform throughout the optically active region between the two closely-spaced slab sections. This structure also permits a large flexibility in selecting the optical waveguide parameters and the electromagnetic waveguide parameters. Each of the two ends of the waveguide is sealed by a waveguide end wall including a laser reflecting mirror aligned through the optically active region with the laser reflecting mirror at the opposite end. The metal microwave waveguide is the vacuum envelope of the laser, no external vacuum envelope being required.

In the preferred embodiment of the invention, the dimensions of the waveguide are such that the waveguide cutoff frequency is just above the frequency of a home microwave oven magnetron, namely 2450 MHz, and a home microwave oven magnetron is the excitation source of the waveguide, resulting in great cost savings.

The microwave excitation is preferably introduced into the optically active region via a waveguide connected to the magnetron output at one end thereof and a ramped end section coupled to the optically active region at the other end thereof. The ramped section narrows down to the spacing between the two closely-spaced slab sections of the optically active region.

BRIEF DESCRIPTION OF THE DRAWINGS

FIG. 3a is a front cross-sectional view of one embodiment of the laser of the present invention.

FIG. 3b is a front cross-sectional view of an alternative embodiment corresponding to FIG. 3a.

FIG. 4 is a front cross-sectional view of a preferred embodiment of the present invention.

DETAILED DESCRIPTION OF THE INVENTION

Figure 1:
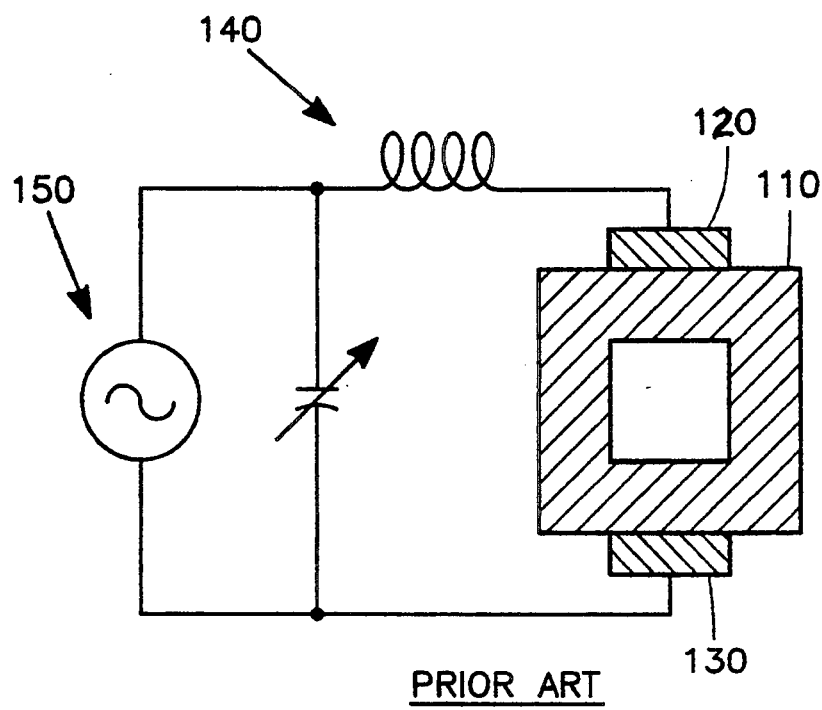
FIG. 1 is a front cross-sectional view of a transverse waveguide RF pumped $CO_2$ laser of the prior art.
Figure 2:
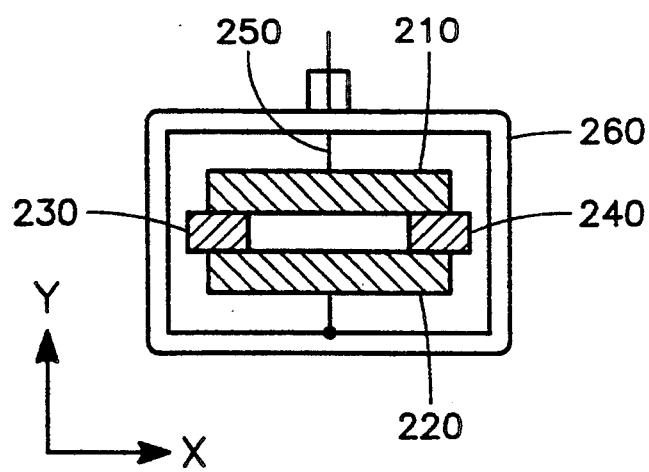
FIG. 2 illustrates a front cross-sectional view of a hybrid laser conceived by the inventors herein.

Referring to FIG. 3a, a $CO_2$ laser in one embodiment of the invention includes an all-metal double ridge microwave waveguide 310 which forms a vacuum envelope whose interior 315 contains the $CO_2$ laser gas mixture. The waveguide 310 has two opposing closely spaced flat horizontal slab sections 320, 325 facing one another, whose interior surfaces 320a, 325a are polished so as to function as optical waveguide surfaces. The optically active region of the laser is the area 327 between the opposing closely spaced slab sections 320, 325. Preferably, in order to permit a virtually uniform field throughout the optically active region 327 at the desired microwave frequency, the vertical walls 330, 335 of the waveguide 310 are spaced apart from the longitudinal edges of the opposing closely spaced slab sections 320, 325 by main floor and ceiling sections 340, 345 forming ridges 350 and 355 supporting the closely spaced slab sections 320, 325, respectively. A vertical end wall 360 at each end of the waveguide 310 formed with or attached to the floor and ceiling sections 340, 345 and side walls 330, 335 completes the sealed vacuum envelope. Each vertical end wall 360 supports a reflective laser mirror 365 in registration with the optically active region 327. The laser mirrors 365 at each end of the optically active region 327 are aligned with one another in accordance with conventional techniques. Water jackets (not shown in FIG. 3a) for conducting coolant along the length of the optically active region 327 may be located proximal each ridge 350, 355.

The lengths of the floor and ceiling sections 340, 345 may be varied in accordance with the microwave frequency to operate at or near cutoff in accordance with well-known formulas. In this way, the microwave power will be most uniform along the length of the active region 327. In the extreme case, these lengths may reach zero, with the resulting waveguide cross-sectional configuration illustrated in FIG. 3b. At this extreme, the width between the vertical side walls of the waveguide 310' is just slightly larger than a half-wavelength of the electromagnetic (microwave) radiation.

Figure 5:
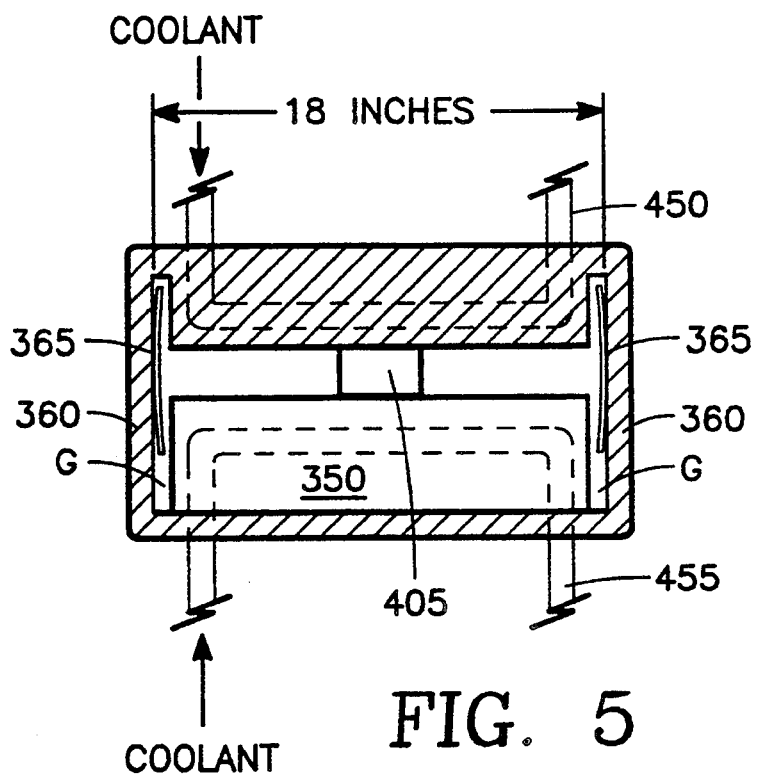
FIG. 5 is a side cross-sectional view of the embodiment of FIG. 4.
Figure 6:
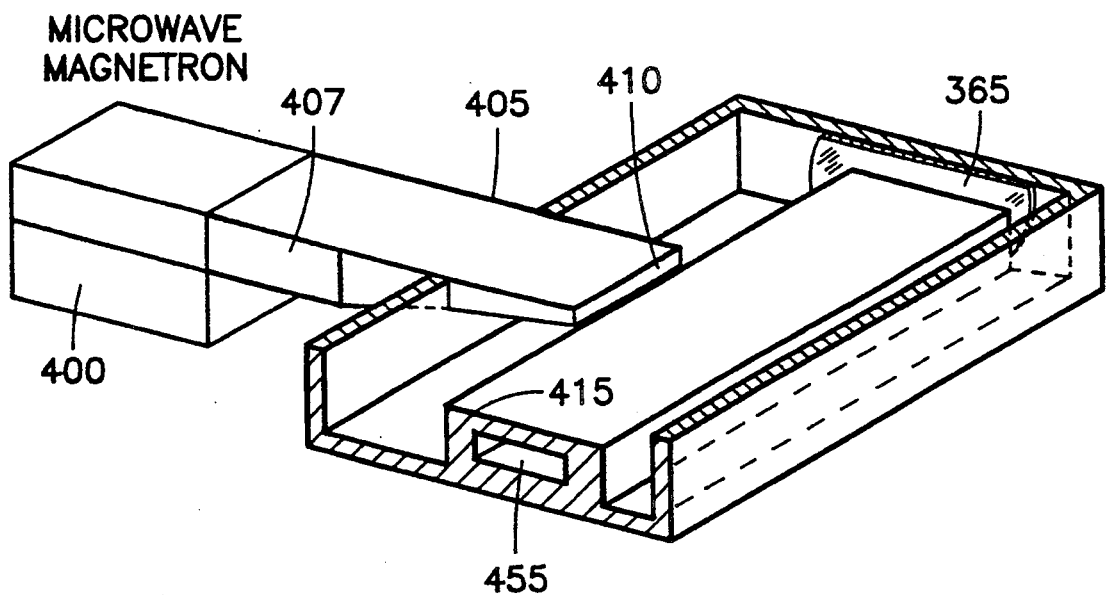
FIG. 6 is a perspective partially cut-away view of the embodiment of FIGS. 4 and 5.

In one embodiment of the invention, microwave energy for pumping the laser is introduced via a microwave antenna 370 connected via a coaxial cable 375 extending through the ceiling section 345 to a microwave source (not shown). The cable 375 is sealed to the ceiling section 345 to maintain the vacuum envelope. The electromagnetic field is concentrated in the optically active region 327 due to the close spacing of the opposing slab sections 320, 325. The spacing between the slab sections 320, 325 and the gas pressure in the vacuum envelope are adjusted to favor a plasma discharge to form there, that is, at a Paschen minimum in the optically active region 327.

one preferred embodiment of the invention is illustrated in FIGS. 4–6. This preferred embodiment differs from the embodiment of FIG. 3 in that there is only a single ridge 350 which is placed asymmetrically with respect to the vertical side walls 330, 335, and the ceiling section 345 continues uninterrupted across the entire width of the waveguide 310 and includes the interior surface 325a. A microwave source or magnetron 400 is coupled to the optically active region 327 by a ramped waveguide 405 whose narrow output end 410 matches the narrow vertical spacing between the interior optical waveguide surfaces 320a, 325a and terminates at the optically active region 327 therebetween. The large input end of the ramped waveguide 405 opens out to a standard microwave waveguide 407 (e.g., a WR-284 standard copper waveguide or the slightly larger size used in microwave ovens) connected directly to the output of the magnetron 400. The ramped waveguide 405 about 3 inches long and is at a ramp angle of about 20 degrees.

Strong electric field concentrations occur between the optical waveguide surfaces 325a, 320a, causing an RF discharge therebetween to form the active region 327 of the laser. The waveguide 310 must be big enough so that microwaves propagate, that is, the waveguide must not be seriously cut off. As will be discussed below, the preferred frequency of the microwave source 400 is 2450 MHz, for economic reasons. The free space wavelength at 2450 MHz is 122.5 mm, significantly shorter than the desired overall length of the laser. As the waveguide transverse dimensions are adjusted toward the cutoff condition, the waveguide wavelength increases over the free space wavelength, and becomes infinite at exactly the cutoff condition. Thus, to make a long laser, the transverse waveguide dimensions should be adjusted to be near cutoff, but just a little larger. As a practical matter, the loading by the discharge will change the cutoff condition, and therefore it is desireable to first calculate the exact cutoff dimensions, and then determine the actual optimum conditions by experiment. One can make a waveguide cutoff at 2450 MHz, with a gap spacing between the optical waveguide surfaces 325a, 320a of 2.8 mm and a width of the ridge 350 of 15 mm, providing overall dimensions corresponding to standard copper microwave waveguide WR-137, permitting cost-effective fabrication. Because the WR-137 standard waveguide is cut off at 4301 MHz without the ridge 350, short-circuit sections at the each end of the waveguide 310 for confining the microwave fields are obtained by terminating the longitudinal ends of the ridge 350 just before the optical mirrors 365, as shown in FIG. 5, leaving a gap "G" between the ends of the ridge 350 and the end walls 360. The waveguide is extended beyond the length of the ridge 350 by the width of the gap G, which must be sufficient to provide a substantial (e.g., 99%) reflectivity for the microwave radiation in the waveguide. The calculation of this width for a waveguide beyond cutoff is well-known in the art. Preferably, the laser mirrors 365 are curved. If the mirrors are flat, however, then the width of the gap G must be minimized and there is a tradeoff between reflectivity of the microwave radiation at the waveguide ends and the optimization of the mirror spacing with respect to the ridge 350. The typical length between the mirrors 365 eighteen inches, but can be in the range of about ten inches to thirty inches. Offsetting the ridge 350 to the asymmetrical configuration of FIG. 4 (so that the ridge 350 is not halfway between the vertical side walls 330 335) provides a fine adjustment to the microwave resonant condition. In the preferred embodiment the microwave waveguide 310 is tuned to 2450 MHz because at this frequency the microwave source or magnetron 400 can be the type employed in household microwave ovens, the principal advantage thereof being that their cost of manufacture is currently on the order of only $30.00 per unit.

The laser of FIGS. 4–6 is preferably operated using a mixture of $CO_2$, $N_2$ and He at a ratio of 1:1:6, respectively, with a small amount of Xenon added thereto in accordance with conventional practice, at a pressure of 20–100 Torr. Preferably, water jackets 450, 455 running the entire length of the waveguide 310 provide cooling near the optically active region 327.

Figure 7:
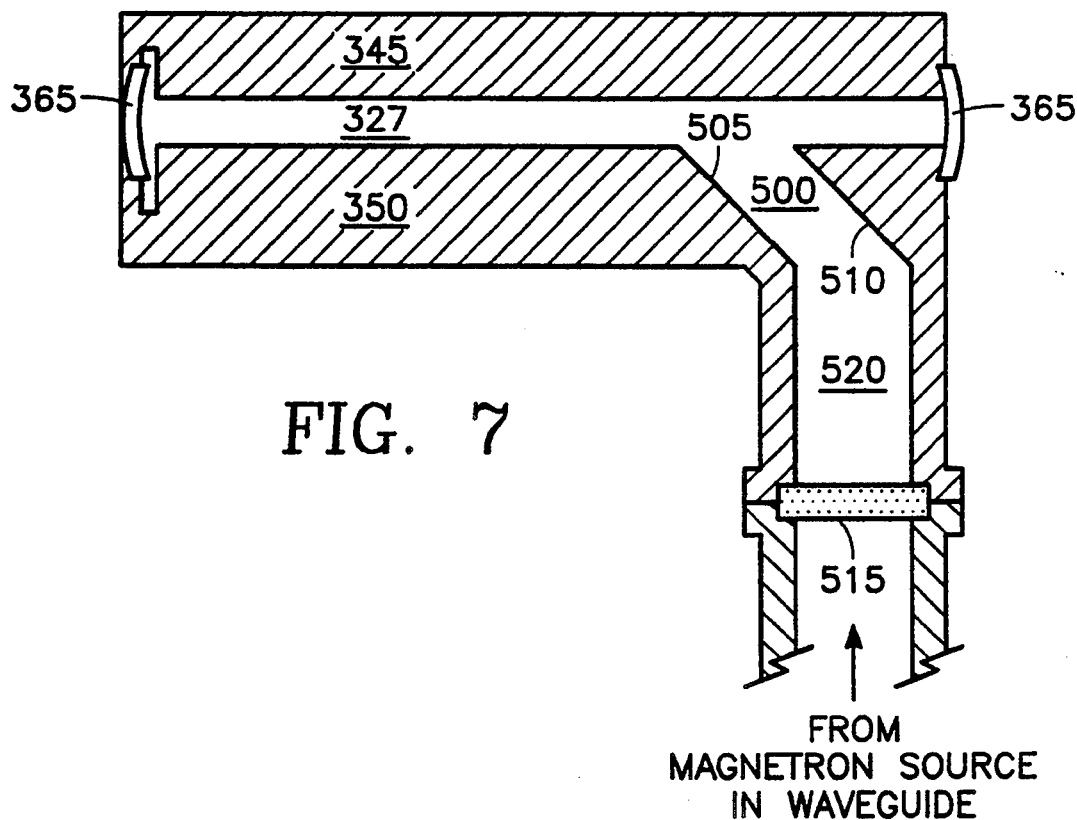
FIG. 7 is a side cross-sectional view of a second alternative embodiment of the invention.

FIG. 7 illustrates a second alternative embodiment of the invention in which the embodiment of FIGS. 4–6 is modified by replacing the ramped waveguide 405 facing the center of the optically active region 327 with a ramped waveguide 500 extending through the ridge 350 and through the bottom optical waveguide surface 320a near one end of the optically active region 327 and opening out into the optically active region 327 in the direction away from that one end. The ramped waveguide 500 of FIG. 7 includes left and right interior ramp surfaces 505, 510, respectively. A microwave magnetron source is coupled to the ramped waveguide 500 through a microwave vacuum window 515 of the type well-known in the art via a straight waveguide section 520.

Figure 8:
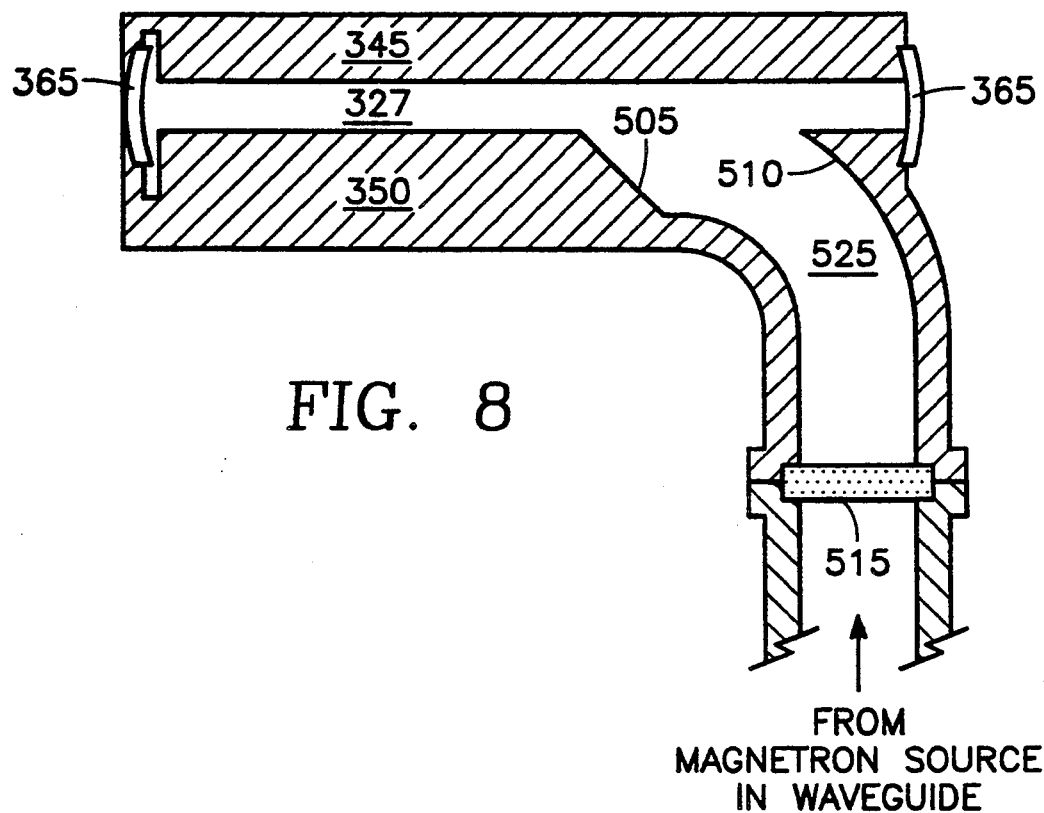
FIG. 8 is a side cross-sectional view of a third alternative embodiment of the invention.

FIG. 8 illustrates a modification of the embodiment of FIG. 7 in which the straight waveguide section 520 is replaced by a curved waveguide 525.

While the invention has been described in detail by specific reference to preferred embodiments thereof, it is understood that variations and modifications thereof may be made without departing from the true spirit and scope of the invention.

What is claimed is:

1. A microwave-pumped waveguide gas laser, comprising:
 a microwave waveguide comprising,
   (a) a vacuum envelope capable of containing laser gas of said laser,
   (b) first and second optical waveguide surfaces extending at least partially across a width of said waveguide and extending along a length of said waveguide, said optical waveguide surfaces facing one another as an optical waveguide of said laser and defining a longitudinal optically active region therebetween, and wherein at least one of said optical waveguide surfaces is supported on a ridge of said microwave waveguide,
   (c) a pair of vertical side walls facing said optically active region and displaced therefrom by a sufficient distance whereby said optically active region opens out into remaining portions of said waveguide along either side of said ridge and an electric field in said optically active region is virtually uniform across the lateral width thereof, and,
   (d) a pair of end-walls wherein respective ends of said ridge are separated from said end-walls by a gap creating a short-circuit boundary for longitudinally confining electromagnetic fields within the waveguide;
 a pair of reflecting mirrors at each end of said optically active region; and
 means for coupling electromagnetic energy to said waveguide.

2. The laser of claim 1 wherein said means for coupling electromagnetic energy comprises an antenna protruding into said waveguide and connected to an external electromagnetic energy source.

3. The laser of claim 1 wherein said means for coupling electromagnetic energy comprises a ramped waveguide having a narrow output opening parallel to said optical waveguide surfaces and facing said optically active region and a broad input opening coupled to an external electromagnetic energy source.

4. The laser of claim 3 wherein said output opening faces an intermediate portion between the two ends of said optically active region.

5. The laser of claim 1 wherein said means for coupling electromagnetic energy comprises a ramped waveguide having a broad output opening through one of said optical waveguide surfaces and a narrow input opening coupled to an external electromagnetic energy source.

6. The laser of claim 5 wherein said broad output opening faces an end portion of said optically active region near one end thereof and opens out in a direction generally away from said one end.

7. The laser of claim 1 wherein said optical waveguide surfaces are polished to an optical smoothness.

8. The laser of claim 1 further comprising a water jacket disposed below at least one of said first and second optical waveguide surfaces for conducting coolant along the length thereof.

9. The laser of claim 1 wherein said laser gas comprises $CO_2$ and a source of said electromagnetic energy comprises a microwave magnetron.

10. The laser of claim 1 wherein said microwave waveguide is tuned to a cut off frequency of 2450 MHz and a source of said electromagnetic energy comprises a microwave magnetron, said microwave magnetron producing 2450 MHz microwave radiation.

11. The laser of claim 1 wherein said first and second optical waveguide surfaces extend across the entire width of said microwave waveguide whereby said microwave waveguide has a simple rectangular cross-sectional shape.

12. The laser of claim 1 wherein said second optical waveguide surface is supported on a second ridge of said microwave waveguide extending toward the other ridge.

13. The laser of claim 1 wherein said second optical waveguide surface is co-planar with a ceiling of said microwave waveguide.

14. The laser of claim 1 wherein said optical waveguide surfaces are flat and parallel to one another and are separated by a height of said optically active region which is less than the width of said optically active region, said width being sufficient to reduce damage to said reflecting mirrors.

15. A microwave waveguide for a microwave-pumped waveguide gas laser, said microwave waveguide forming an all-metal vacuum envelope for containing laser gas of said laser and including,
   (a) first and second optical waveguide surfaces extending at least partially across a width of said microwave waveguide and extending along a length of said waveguide, said optical waveguide surfaces facing one another as an optical waveguide of said laser and defining a longitudinal optically active region therebetween, and wherein at least one of said optical waveguide surfaces is supported on a ridge of said microwave waveguide;
   (b) a pair of vertical side walls facing said optically active region and displaced therefrom by a sufficient distance whereby said optically active region faces remaining portions of said waveguide along either side of said ridge; and,
   (c) a pair of end-walls wherein respective ends of said ridge are separated from said end-walls by a gap creating a short-circuit boundary for longitudinally confining electromagnetic fields within the waveguide.

16. The microwave waveguide of claim 15 wherein said microwave waveguide includes means for mounting a pair of reflecting mirrors at each end of said optically active region and wherein said microwave waveguide is connectable to a source of microwave electromagnetic energy.

17. The microwave waveguide of claim 15 wherein said optical waveguide surfaces are flat and parallel to one another and are separated by a height of said optically active region which is less than the width of said optically active region.

* * * * *